(12) United States Patent
Volny et al.

(10) Patent No.: US 10,549,861 B2
(45) Date of Patent: Feb. 4, 2020

(54) REDUNDANT LAYER FOR INFLATABLE EVACUATION COMPONENT

(71) Applicant: Goodrich Corporation, Charlotte, NC (US)

(72) Inventors: Jaro S. Volny, Scottsdale, AZ (US); Drew Hartman, Phoenix, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 462 days.

(21) Appl. No.: 15/350,808

(22) Filed: Nov. 14, 2016

(65) Prior Publication Data
US 2018/0134398 A1 May 17, 2018

(51) Int. Cl.
*B64D 25/14* (2006.01)
*B64D 25/18* (2006.01)

(52) U.S. Cl.
CPC ............ *B64D 25/14* (2013.01); *B64D 25/18* (2013.01)

(58) Field of Classification Search
CPC ..... B64D 25/14; B64D 25/18; Y10S 244/905; A62B 1/20
USPC ............................ 244/137.2, 905; 152/342.1
See application file for complete search history.

(56) References Cited

U.S. PATENT DOCUMENTS

| | | | | | |
|---|---|---|---|---|---|
| 2,936,056 | A | * | 5/1960 | Heyniger | A62B 1/20 182/48 |
| 3,359,579 | A | * | 12/1967 | Reffell | B63C 9/02 114/345 |
| 3,468,472 | A | * | 9/1969 | Hahn | F04F 5/461 137/223 |
| 3,674,124 | A | * | 7/1972 | Summer | B64D 25/14 193/25 B |
| 3,829,353 | A | * | 8/1974 | Fisher | A62B 1/20 428/12 |
| 3,860,984 | A | * | 1/1975 | Fisher | A62B 1/20 441/41 |
| 4,143,697 | A | * | 3/1979 | Igea | B60C 17/00 152/400 |

(Continued)

FOREIGN PATENT DOCUMENTS

| | | |
|---|---|---|
| DE | 4309954 | 9/1994 |
| IT | 1128610 | 5/1986 |

OTHER PUBLICATIONS

European Patent Office, European Search Report dated Mar. 29, 2018 in Application No. 17201443.3-1010.

*Primary Examiner* — Richard R. Green
*Assistant Examiner* — Brady W Frazier
(74) *Attorney, Agent, or Firm* — Snell & Wilmer L.L.P.

(57) ABSTRACT

The inflatable component includes, according to various embodiments, a first inflatable bladder defining a first fluid chamber and a second inflatable bladder defining a second fluid chamber. The second inflatable bladder may circumscribe the first inflatable bladder such that the first inflatable bladder is disposed in the second fluid chamber. The inflatable component also includes, according to various embodiments, an inlet valve coupled to the first inflatable bladder and the second inflatable bladder, wherein the inlet valve is configured to deliver fluid to the first fluid chamber. In various embodiments, the inflatable component also includes a pressure relief valve coupled to the first inflatable bladder, wherein fluid communication between the first fluid chamber and the second fluid chamber is via the pressure relief valve.

17 Claims, 4 Drawing Sheets

(56) References Cited

U.S. PATENT DOCUMENTS

| | | | |
|---|---|---|---|
| 4,519,782 A | 5/1985 | Fisher | |
| 4,534,445 A * | 8/1985 | Fisher | B64D 25/14 182/48 |
| 4,657,516 A | 4/1987 | Tassy | |
| 5,385,191 A * | 1/1995 | Aflague | B60C 5/04 141/4 |
| 5,746,850 A | 5/1998 | Luscher et al. | |
| 5,820,773 A | 10/1998 | Hintzman et al. | |
| 6,004,176 A | 12/1999 | Moran | |
| 6,298,970 B1 * | 10/2001 | Targiroff | B64D 25/14 182/48 |
| 6,375,529 B1 | 4/2002 | Infante et al. | |
| 6,581,334 B2 * | 6/2003 | Oney | A62B 1/20 138/120 |
| 6,698,545 B2 * | 3/2004 | Baker | B64D 25/14 182/48 |
| 6,877,698 B2 * | 4/2005 | Baker | B64D 25/14 182/48 |
| 7,090,168 B1 * | 8/2006 | Brown | B64D 25/14 182/48 |
| 7,467,764 B2 * | 12/2008 | Hintzman | B64D 25/14 182/48 |
| 8,215,586 B2 * | 7/2012 | O'Donnell | B64D 25/14 182/48 |
| 8,875,761 B2 * | 11/2014 | French | B60C 5/08 152/341.1 |
| 2004/0104307 A1 * | 6/2004 | Stokes | B64D 25/14 244/137.2 |
| 2004/0151600 A1 * | 8/2004 | Bock | B64D 25/14 417/244 |
| 2007/0045473 A1 * | 3/2007 | Clegg | B64D 25/14 244/137.2 |
| 2008/0191097 A1 * | 8/2008 | McDonald | B64D 25/14 244/137.2 |
| 2010/0096056 A1 * | 4/2010 | Smith | B60C 5/04 152/342.1 |
| 2010/0266424 A1 * | 10/2010 | Renz | F04F 5/463 417/191 |

* cited by examiner

REDUNDANT LAYER FOR INFLATABLE EVACUATION COMPONENT

FIELD

The present disclosure relates to aircraft evacuation assemblies, and more specifically, to inflatable components of aircraft evacuation assemblies.

BACKGROUND

An aircraft evacuation assembly may include inflatable components that, once deployed, help passengers disembark from an aircraft in the event of an emergency or other evacuation event. In certain applications, an inflatable component of an aircraft evacuation assembly may also function as a life raft if, for example, the aircraft landed in or was otherwise situated in or over water. Accordingly, because the inflatable components are potentially life-saving, of, ensuring that such components remain inflated (e.g., preventing inadvertent deflation) is important to the reliability and safety of aircraft evacuation assemblies.

SUMMARY

In various embodiments, an inflatable component of an aircraft evacuation assembly is disclosed herein. The inflatable component includes, according to various embodiments, a first inflatable bladder defining a first fluid chamber and a second inflatable bladder defining a second fluid chamber. The second inflatable bladder may circumscribe the first inflatable bladder such that the first inflatable bladder is disposed in the second fluid chamber. The inflatable component also includes, according to various embodiments, an inlet valve coupled to the first inflatable bladder and the second inflatable bladder, wherein the inlet valve is configured to deliver fluid to the first fluid chamber. In various embodiments, the inflatable component also includes a pressure relief valve coupled to the first inflatable bladder, wherein fluid communication between the first fluid chamber and the second fluid chamber is via the pressure relief valve.

The inlet valve may include an interface for connecting to a fluid storage tank of the aircraft evacuation assembly. In various embodiments, the inlet valve is an aspirator configured to entrain air from atmosphere (e.g., ambient air) into the first fluid chamber. In various embodiments, the first inflatable bladder is coupled to the inlet valve at a first location along a length of the inlet valve and the second inflatable bladder is coupled to the inlet valve at a second location along the length of the inlet valve. The first location may be directly adjacent the second location such that a portion of an exterior surface of the first inflatable bladder is substantially in direct contact with at least a portion of an interior surface of the second inflatable bladder. In various embodiments, the first location is spaced apart from the second location such that a gap exists and is at least partially defined between the first inflatable bladder at the first location and the second inflatable bladder at the second location. The first inflatable bladder and the second inflatable bladder, in response to both the first inflatable bladder and the second inflatable bladder being inflated, may bound a void defined between the first inflatable bladder and the second inflatable bladder. The void may be maintained between the inflatable bladders under normal operating/inflated conditions. In various embodiments, the first inflatable bladder is indirectly coupled to the second inflatable bladder via the inlet valve.

The second fluid chamber may be isolated from direct fluid receiving communication with the inlet valve. For example, fluid communication between the first fluid chamber and the second fluid chamber may be exclusively via the pressure relief valve. In various embodiments, the inflatable component further includes a plurality of flexible spacer elements disposed between and coupled to the first inflatable bladder and the second inflatable bladder. The inflatable component may be a slide-raft inflatable of the aircraft evacuation assembly.

In various embodiments, the pressure relief valve has a diameter between about 1 inch and about 6 inches. In various embodiments, the pressure relief valve comprises a diameter between about 2 inches and about 4 inches. In various embodiments, the ratio of the diameter of the pressure relief valve to a diameter of the second inflatable bladder is between about $1/10$ and about $3/10$.

Also disclosed herein, according to various embodiments, is an aircraft evacuation assembly. The aircraft evacuation assembly may include a packboard, a fluid storage tank mounted to the packboard, and a slide-raft inflatable. The slide-raft inflatable may include a first inflatable bladder defining a first fluid chamber and a second inflatable bladder defining a second fluid chamber. The second inflatable bladder may circumscribe the first inflatable bladder such that the first inflatable bladder is disposed in the second fluid chamber. The slide-raft inflatable may also include an inlet valve and a pressure relieve valve. The inlet valve may be coupled to the first inflatable bladder and the second inflatable bladder such that the inlet valve is coupled in fluid receiving communication with the fluid storage tank to deliver a fluid from the fluid storage tank to the first fluid chamber. The pressure relief valve may be coupled to the first inflatable bladder such that fluid communication between the first fluid chamber and the second fluid chamber is via the pressure relief valve. In various embodiments, the inlet valve is an aspirator configured to entrain air from ambient atmosphere into the first fluid chamber in response to the fluid from the fluid storage tank being delivered to the first fluid chamber.

Also disclosed herein, according to various embodiments, is a method of deploying a slide-raft inflatable of an aircraft evacuation assembly. The method may include inflating a first inflatable bladder by actuating an inlet valve to deliver fluid into a first fluid chamber of the first inflatable bladder of the slide-raft inflatable. The method may further include, in response to a fluid pressure in the first fluid chamber reaching a predetermined pressure, inflating a second inflatable bladder by delivering the fluid from the first fluid chamber of the first inflatable bladder to a second fluid chamber of the second inflatable bladder of the slide-raft inflatable. The second inflatable bladder, according to various embodiments, circumscribes the first inflatable bladder such that the first inflatable bladder is disposed in the second fluid chamber.

In various embodiments, the inlet valve is an aspirator such that inflating the first inflatable bladder of the slide-raft inflatable includes entraining air from atmosphere into a flow of fluid from a fluid storage tank of the aircraft evacuation assembly into the first fluid chamber of the first inflatable bladder. In various embodiments and in response to inflating the first inflatable bladder and inflating the second inflatable bladder, the first inflatable bladder is free from direct contact with the second inflatable bladder.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion. Also, like reference numbers refer to similar elements and steps throughout the figures.

A first component that is "radially outward" of a second component means that the first component is positioned at a greater distance away from a central longitudinal axis. A first component that is "radially inward" of a second component means that the first component is positioned closer to the central longitudinal axis than the second component.

Figure 1:
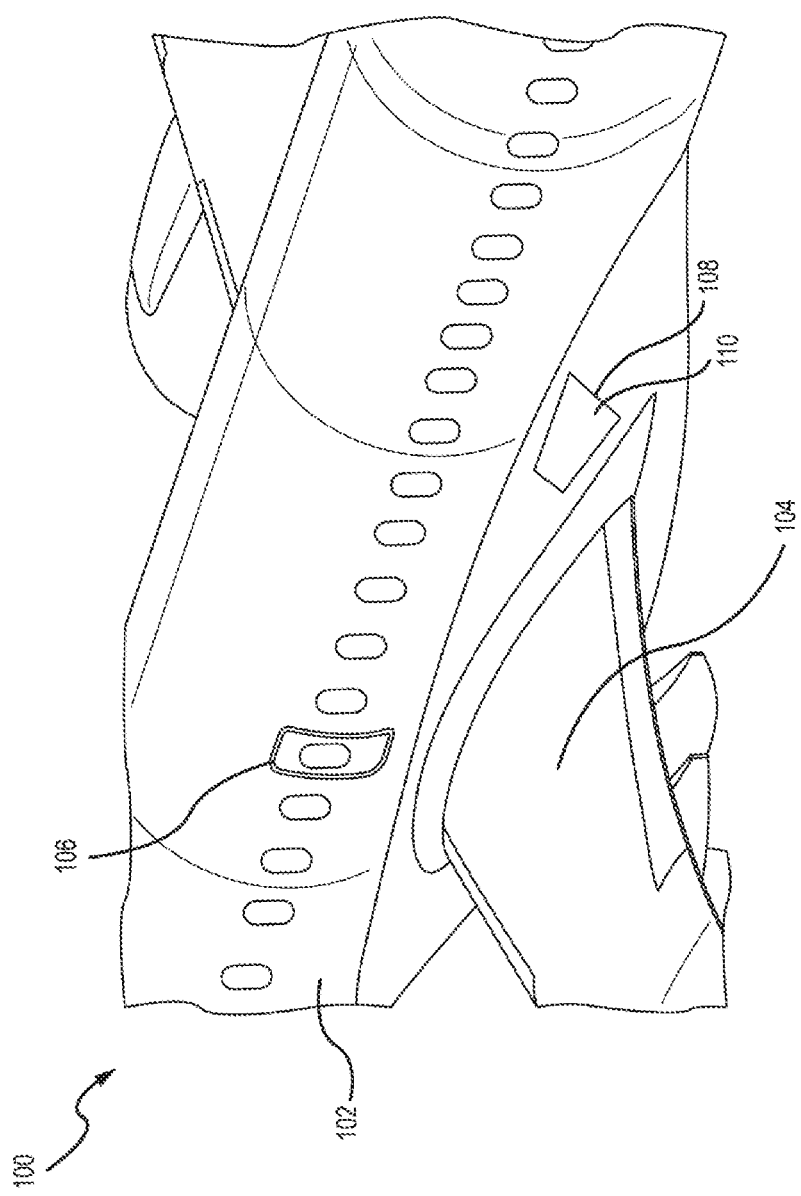
FIG. 1 illustrates a perspective view of an evacuation assembly of an aircraft, in accordance with various embodiments.

In various embodiments, the present disclosure includes an inflatable component 220 (with reference to FIG. 2) of an aircraft evacuation assembly 108 (with reference to FIG. 1). Referring to FIG. 1, an exemplary aircraft 100 is shown, in accordance with various embodiments. Aircraft 100 may comprise a fuselage 102 with wings 104 fixed to fuselage 102. Emergency exit door 106 may be disposed on fuselage over wing 104 such that passengers exiting emergency exit door 106 would exit onto wing 104. An evacuation assembly 108 may be disposed aft of emergency exit door 106. Blowout panel 110 may cover evacuation assembly 108 when installed on the aircraft 100. In various embodiments, the evacuation assembly 108 may include and/or be housed within a packboard mounted to the aircraft 100.

In the event of an emergency or other evacuation event, the evacuation assembly 108 may jettison the blowout panel 110 and deploy the inflatable component 220, such as an inflatable slide and/or an inflatable raft. In various embodiments, the inflatable component 220 may function as both an evacuation slide and a raft. In various embodiments, deployment of the evacuation assembly 108 may be in response to emergency exit door 106 opening.

Figure 2:
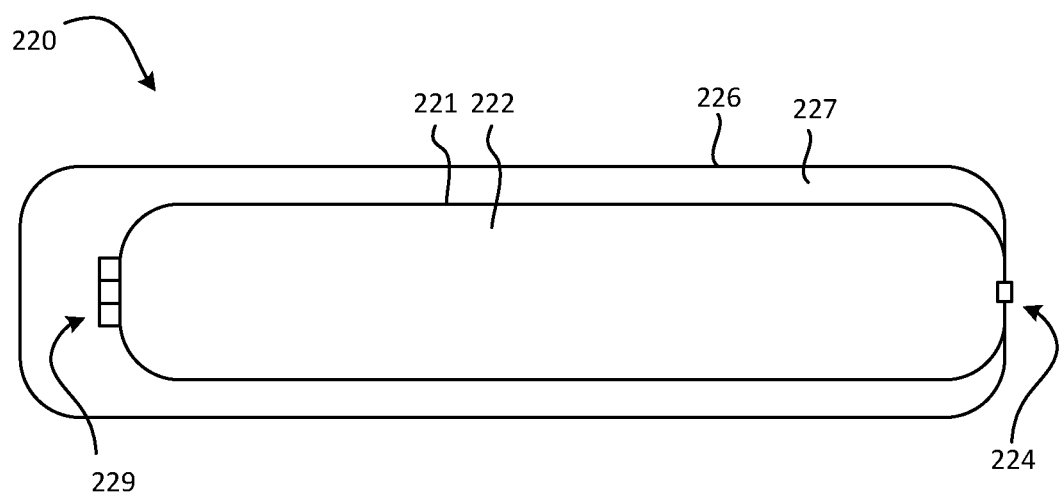
FIG. 2 illustrates a cross-sectional view of an inflatable component of an aircraft evacuation assembly having a single inlet valve, in accordance with various embodiments.

As mentioned above, preventing failure (e.g., inadvertent deflation) of inflatable components, such as the inflatable component 220 of FIG. 2, is important because maintaining appropriate inflation levels of such components may provide potentially life-saving support to passengers of the aircraft 100. Accordingly, the inflatable component 220 disclosed herein, according to various embodiments, includes two inflatable bladders 221, 226 to provide dual layer redundancy to the inflatable component 220. The term "bladder" as used herein refers to any flexible structure that has and/or at least partially defines a hollow cavity/chamber that is capable of being inflated. For example, one or both of the inflatable bladders 221, 226 may be a tube or a flexible duct that can be inflated and configured to retain a fluid therein within a desired pressure range. Accordingly, while FIGS. 2-5 show schematic views of the inflatable component in a substantially inflated state, the inflatable components may be in a collapsed state and may have a condensed form when stored in a pre-deployed, pre-inflated state.

In various embodiments, because of the redundancy of the two inflatable bladders 221, 226, if one of the inflatable bladders 221, 226 were to fail (e.g., puncture, tear, rip, etc.), the other bladder may still provide the potentially life-saving assistance to the passengers of the aircraft 100. The inflatable component 220 may be an inflatable evacuation slide, an inflatable evacuation slide, and/or an inflatable slide-raft hybrid (e.g., a slide that also functions as a raft).

The first inflatable bladder 221 may define a first fluid chamber 222 and the second inflatable bladder 226 may define a second fluid chamber 227. In various embodiments and with reference to FIG. 2, the second inflatable bladder 226 circumscribes the first inflatable bladder 221 such that the first inflatable bladder 221 is disposed within the second fluid chamber 227. In various embodiments, the first inflatable bladder 221 and the second inflatable bladder 226 may be made from a flexible material, such as a flexible fabric, plastic, composite, or textile material, among others.

The inflatable component 220 may also include an inlet valve 224 and a pressure relief valve 229. The inlet valve 224, according to various embodiments, includes structure that defines a passageway to deliver fluid into one or both of the fluid chambers 222, 227. In various embodiments, the inlet valve 224 may include a movable valve member that can be actuated to allow, restrict, block, or otherwise control the flow of fluid through the valve 224. In various embodiments, the inlet valve 224 may not include movable valve members and thus may simply include or define a passageway through which a controlled fluid (e.g., actuated, controlled upstream) may flow. For example, the inlet valve 224 may include an interface that may be coupled with an upstream fluid source, such as a fluid storage tank. In various embodiments, the fluid storage tank may be a charged tank that contains a compressed fluid. For example, the charged tank may be a pneumatic gas cylinder and flow of the compressed fluid from the charged tank may be controlled upstream of the inlet valve 224 or may be controlled directly at the inlet valve 224.

With reference to FIG. 2 and according to various embodiments, the inflatable component 220 may include a single inlet valve 224 that is coupled both the first inflatable bladder 221 and the second inflatable bladder 226. The inlet valve 224 may be configured to deliver fluid into the first fluid chamber 222 of the first inflatable bladder 221. The pressure relief valve 229 may be configured to deliver fluid from the first fluid chamber 222 to the second fluid chamber 227. Thus, fluid communication between the first fluid chamber 222 and the second fluid chamber 227 is via the pressure relief valve 229, according to various embodiments. The pressure relief valve 229, according to various embodiments, may be the exclusive means of fluid communication between the first fluid chamber 222 and the second fluid chamber 227.

In various embodiments, the pressure relief valve 229 is configured to meter and/or deliver fluid from the first fluid chamber 222 into the second fluid chamber 227 in response to the fluid pressure within the first fluid chamber 222 reaching a predetermined pressure threshold. Accordingly, the pressure relief valve 229 may include a biasing element, such as a spring, coupled to a diaphragm. Once the pressure reaches the predetermined pressure threshold, said pressure may overcome the bias force of the biasing element and thus may move the diaphragm to allow fluid to bleed into the second fluid chamber 227.

Figure 3:
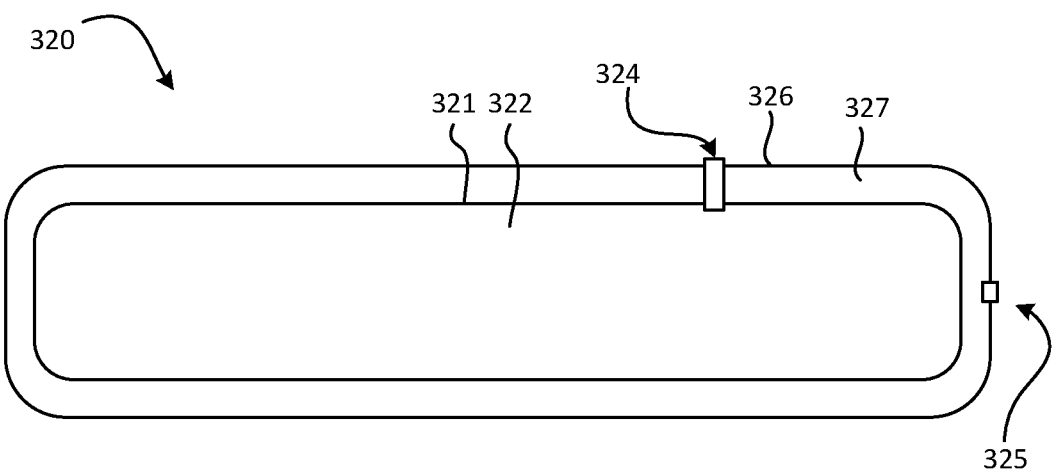
FIG. 3 illustrates a cross-sectional view of an inflatable component of an aircraft evacuation assembly having two inlet valves, in accordance with various embodiments.

With reference to FIG. 3 and according to various embodiments, the inflatable component 320 may include two inlet valves: a first inlet valve 324 and a second inlet valve 325. The first inlet valve 324 may extend through and be coupled to both the first inflatable bladder 321 and the second inflatable bladder 326. Accordingly, the first inlet valve 324 may be configured to deliver fluid to the first fluid chamber 322. The second inlet valve 325 may extend through and be coupled to the second inflatable bladder 326 and thus may be configured to deliver fluid to the second fluid chamber 327. In such embodiments, the first fluid chamber 322 and the second fluid chamber 327 may not be in fluid communication with each other and thus may be completely fluidly isolated from each other.

Figure 4:
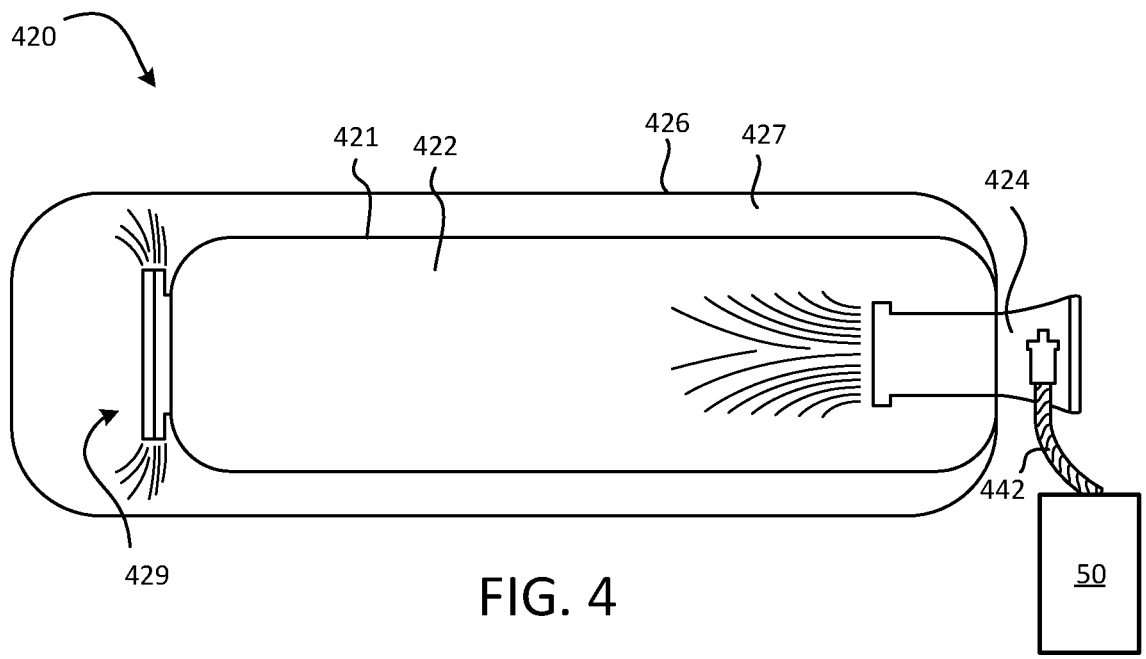
FIGS. 4 and 5 illustrate cross-sectional views of inflatable components of an aircraft evacuation assembly having an inlet aspirator, in accordance with various embodiments.

With reference to FIG. 4 and according to various embodiments, the inflatable component 420 may have an aspirator 424 as the inlet valve. The aspirator 424 may include an interface 442 that is coupleable with a fluid source, such as a fluid storage tank 50. In response to fluid flowing through the interface 442 and into/through the aspirator 424, the aspirator 424 may be configured to entrain ambient atmosphere air into the fluid flow. Accordingly, the aspirator 424 may be configured to deliver fluid from an upstream fluid source, such as fluid storage tank 50, and air from the atmosphere surrounding the aspirator 424.

In various embodiments, as mentioned above with reference to FIG. 2, the aspirator 424 may be coupled to and may extend through both the first inflatable bladder 421 and the second inflatable bladder 426. Thus, the aspirator 424 may be configured to deliver fluid into the first fluid chamber 422, which may then be bled through the pressure relief valve 429 and into the second fluid chamber 427 in response to the pressure within the first fluid chamber 422 reaching a predetermined pressure threshold. In various embodiments, as shown in FIG. 4, the first inflatable bladder 421 and the second inflatable bladder 426 may be coupled to the aspirator 424 at the same or substantially the same location (adjacent each other) along the length of the aspirator 424. In such embodiments, the dual layer redundancy is maintained until each bladder 421, 426 contacts and is coupled to the aspirator 424. In such embodiments, a portion of an exterior surface portion of the first inflatable bladder 421 may be in direct contact with a portion of an interior surface portion of the second inflatable bladder 426. In other words, the respective portions of the two inflatable bladders 421, 426 that are at or in close proximity to the aspirator 424 may be substantially in direct contact with each other. "Substantially" is used in this context to mean that the inflatable bladders 421, 426 may directly contact each other under normal operating/inflated conditions. In various embodiments, despite potentially contacting each other at or near the aspirator 424, the inflatable bladders 421, 426 may not be directly coupled to each other. That is, the first inflatable bladder 421 may not be directly coupled to the second inflatable bladder 426 (e.g., may only be indirectly coupled to each other via the aspirator 424).

Figure 5:
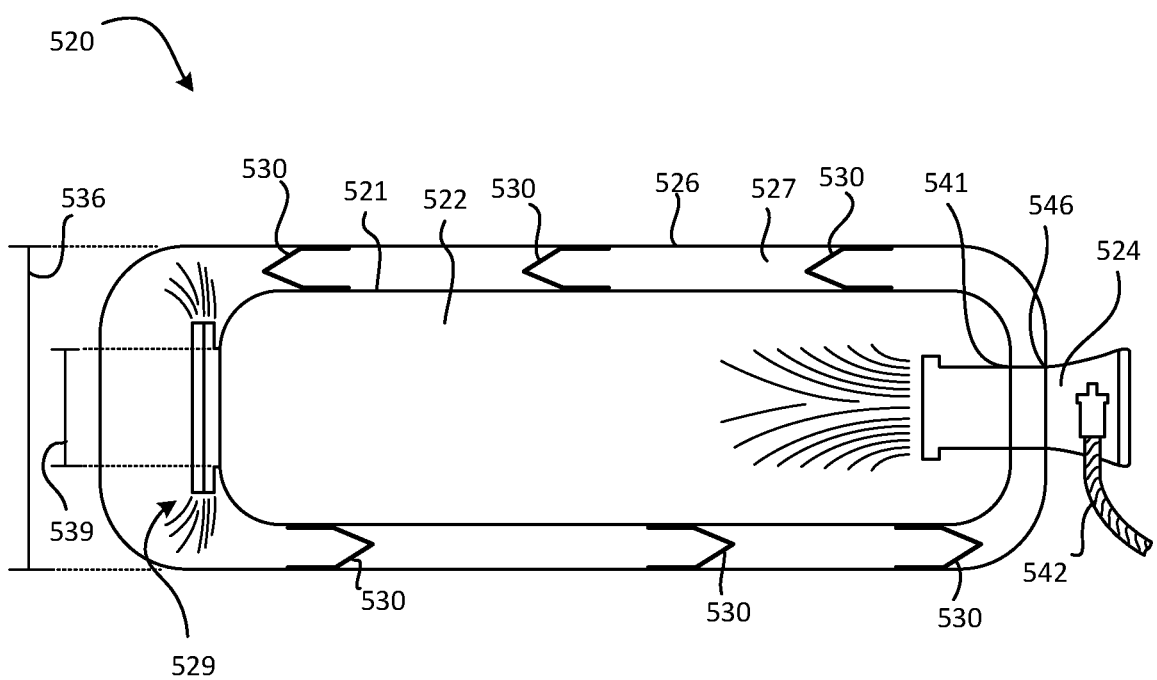

With reference to FIG. 5 and according to various embodiments, the first inflatable bladder 521 and the second inflatable bladder 526 of the inflatable component 520 may both be coupled to the aspirator 524 (e.g., the inlet valve). The first inflatable bladder 521, according to various embodiments, may be coupled to the aspirator 524 at a first location 541 along a length of the aspirator 524 and the second inflatable bladder 526 may be coupled to the aspirator 524 at a second location 546 along the length of the aspirator. In various embodiments, the first location 541 may be spaced apart from the second location 546 such that a gap exists between the first location 541 and the second location 546. Such a configuration may facilitate the second inflatable bladder 526 remaining disposed a distance away from the first inflatable bladder 521 in response to both of the bladders 521, 526 being inflated. That is, in the inflated state (e.g., when the first fluid chamber 522 has been inflated directly via the aspirator 524 and the second fluid chamber 527 has been inflated via the pressure relief valve 529), the two bladders 521, 526 may be configured to remain disposed apart from each other and thus may bound and defined a void/volume between them. In various embodiments, the inflatable bladders 521, 526 are free from direct contact with each other. In such embodiments, the reliability of the inflatable component 520 may further be augmented because, for example, an object that may cause a puncture in the second inflatable bladder 526 will be less likely to puncture the first inflatable bladder 521 because of the space/gap between the two bladders 521, 526.

In various embodiments, the inflatable component 520 may include a plurality of spacer elements 530 disposed in the gap between the two bladders 521, 526. The spacer elements 530 may facilitate maintaining the two bladders 521, 526 spaced apart from each other. In various embodiments, the spacer elements 530 are flexible strips of material that are adhesively bonded to the exterior surface of the first inflatable bladder 521 and the interior surface of the second inflatable bladder 526. In various embodiments, the spacer elements 530 may form a hinge shape. In various embodiments, the spacer elements 530 may be resiliently flexible.

In various embodiments, the pressure relief valve 529 may be a high flow pressure relief vent. In various embodiments, the pressure relief valve 529 may have a diameter 539, as measured across an opening of the first inflatable bladder 521 where the pressure relief valve 529 is coupled to the first inflatable bladder 521, that is between about 1 inch (2.5 centimeters) and about 6 inches (15.2 centimeters). In various embodiments, the diameter 539 of the opening leading to the pressure relief valve 529 is between about 2 inches (5.1 centimeters) and about 4 inches (10.2 centimeters). As used in this context, the term "about" refers to plus or minus 0.5 inches. In various embodiments, a ratio of the diameter 539 of the pressure relief valve to a diameter 536 of the second inflatable bladder 526 is between about 1/10 and about 3/10.

Figure 6:
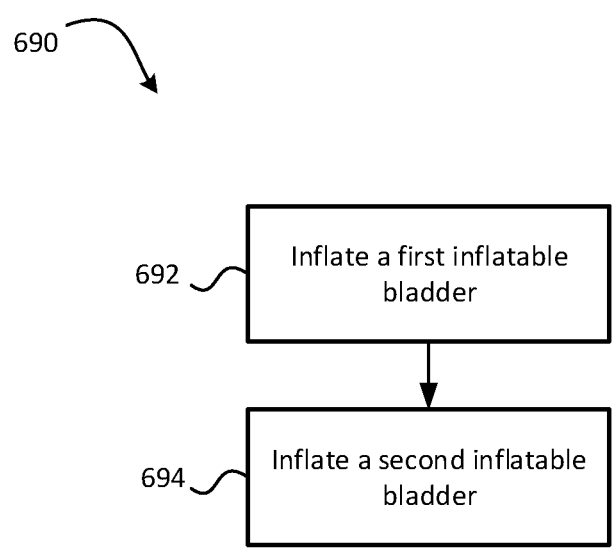
FIG. 6 illustrates a schematic flow chart diagram of a method of deploying a slide-raft inflatable of an aircraft evacuation assembly, in accordance with various embodiments.

With reference to FIG. 6 and according to various embodiments, a method 690 of deploying a slide-raft inflatable of an aircraft evacuation assembly is disclosed. The method 690 includes, according to various embodiments, inflating a first inflatable bladder by actuating an inlet valve to deliver fluid into a first fluid chamber of the first inflatable bladder of the slide-raft inflatable at step 692. The method 690 may further include, in response to a fluid pressure in the first fluid chamber reaching a predetermined pressure, inflating a second inflatable bladder by delivering the fluid from the first fluid chamber of the first inflatable bladder to a second fluid chamber of the second inflatable bladder of the slide-raft inflatable at step 694. The second inflatable bladder may circumscribe the first inflatable bladder such that the first inflatable bladder is disposed in the second fluid chamber.

In various embodiments, the inlet valve includes an aspirator such that inflating the first inflatable bladder of the slide-raft inflatable at step 692 includes entraining air from atmosphere into a flow of fluid from a fluid storage tank of the aircraft evacuation assembly into the first fluid chamber of the first inflatable bladder. In various embodiments, in response to inflating the first inflatable bladder at step 692 and inflating the second inflatable bladder at step 694, the first inflatable bladder is substantially free from direct contact with the second inflatable bladder.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosure is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An inflatable component of an aircraft evacuation assembly, the inflatable component comprising:
    a first inflatable bladder defining a first fluid chamber;
    a second inflatable bladder defining a second fluid chamber, wherein the second inflatable bladder circumscribes the first inflatable bladder such that the first inflatable bladder is disposed in the second fluid chamber;
    an inlet valve coupled to the first inflatable bladder and the second inflatable bladder, wherein the inlet valve is configured to deliver fluid to the first fluid chamber; and
    a pressure relief valve coupled to the first inflatable bladder, wherein fluid communication between the first fluid chamber and the second fluid chamber is via the pressure relief valve;
    wherein the first inflatable bladder is coupled to the second inflatable bladder exclusively via the inlet valve.

2. The inflatable component of claim 1, wherein the inlet valve comprises an interface for connecting to a fluid storage tank of the aircraft evacuation assembly.

3. The inflatable component of claim 1, wherein the inlet valve comprises an aspirator configured to entrain air from atmosphere into the first fluid chamber.

4. The inflatable component of claim 1, wherein the first inflatable bladder is coupled to the inlet valve at a first location along a length of the inlet valve and the second inflatable bladder is coupled to the inlet valve at a second location along the length of the inlet valve, wherein the inflatable component comprises complete layer redundancy via the first and second inflatable bladders.

5. The inflatable component of claim 4, wherein the first location is directly adjacent the second location such that a portion of an exterior surface of the first inflatable bladder is substantially in direct contact with a portion of an interior surface of the second inflatable bladder.

6. The inflatable component of claim 4, wherein the first location is spaced apart from the second location such that a gap exists and is partially defined between the first inflatable bladder at the first location and the second inflatable bladder at the second location.

7. The inflatable component of claim 6, wherein the first inflatable bladder and the second inflatable bladder, in response to both the first inflatable bladder and the second inflatable bladder being inflated, bound a void defined between the first inflatable bladder and the second inflatable bladder.

8. The inflatable component of claim 1, wherein the second fluid chamber is isolated from direct fluid receiving communication with the inlet valve.

9. The inflatable component of claim 8, wherein fluid communication between the first fluid chamber and the second fluid chamber is exclusively via the pressure relief valve.

10. The inflatable component of claim 1, wherein the inflatable component is a slide-raft inflatable of the aircraft evacuation assembly.

11. The inflatable component of claim 10, wherein the pressure relief valve comprises a diameter between about 1 inch and about 6 inches.

12. The inflatable component of claim 10, wherein the pressure relief valve comprises a diameter between about 2 inches and about 4 inches.

13. An aircraft evacuation assembly comprising:
a packboard;
a fluid storage tank mounted to the packboard;
a slide-raft inflatable comprising:
    a first inflatable bladder defining a first fluid chamber;
    a second inflatable bladder defining a second fluid chamber, wherein the second inflatable bladder circumscribes the first inflatable bladder such that the first inflatable bladder is disposed in the second fluid chamber;
    an inlet valve coupled to the first inflatable bladder and the second inflatable bladder, wherein the inlet valve is coupled in fluid receiving communication with the fluid storage tank to deliver a fluid from the fluid storage tank to the first fluid chamber; and
    a pressure relief valve coupled to the first inflatable bladder, wherein fluid communication between the first fluid chamber and the second fluid chamber is via the pressure relief valve;
    wherein the first inflatable bladder is coupled only indirectly to the second inflatable bladder, and such indirect coupling is via the inlet valve.

14. The aircraft evacuation assembly of claim 13, wherein the inlet valve comprises an aspirator configured to entrain air from ambient atmosphere into the first fluid chamber in response to the fluid from the fluid storage tank being delivered to the first fluid chamber.

15. A method of deploying a slide-raft inflatable of an aircraft evacuation assembly, the method comprising:
inflating a first inflatable bladder by actuating an inlet valve to deliver fluid into a first fluid chamber of the first inflatable bladder of the slide-raft inflatable; and
in response to a fluid pressure in the first fluid chamber reaching a predetermined pressure, inflating a second inflatable bladder by delivering fluid from the first fluid chamber of the first inflatable bladder to a second fluid chamber of the second inflatable bladder of the slide-raft inflatable, wherein the second inflatable bladder circumscribes the first inflatable bladder such that the first inflatable bladder is disposed in the second fluid chamber;
wherein in response to inflating the first inflatable bladder and inflating the second inflatable bladder, the first inflatable bladder is free from direct contact with the second inflatable bladder.

16. The method of claim 15, wherein the inlet valve comprises an aspirator such that inflating the first inflatable bladder of the slide-raft inflatable comprises entraining air from atmosphere into a flow of fluid from a fluid storage tank of the aircraft evacuation assembly into the first fluid chamber of the first inflatable bladder.

17. The method of claim 15, wherein fluid communication between the first inflatable bladder and the second inflatable bladder is exclusively via a pressure relief valve.

* * * * *